US010338392B2

(12) United States Patent
Kohler et al.

(10) Patent No.: US 10,338,392 B2
(45) Date of Patent: Jul. 2, 2019

(54) IDENTIFICATION OF AUGMENTED REALITY IMAGE DISPLAY POSITION

(71) Applicant: Microsoft Technology Licensing, LLC, Redmond, WA (US)

(72) Inventors: Jeffrey Kohler, Redmond, WA (US); Shawn Crispin Wright, Sammamish, WA (US); Michael W. McManus, Kirkland, WA (US); Anthony Ambrus, Seattle, WA (US); Korey Krauskopf, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 15/409,472

(22) Filed: Jan. 18, 2017

(65) Prior Publication Data
US 2017/0358140 A1 Dec. 14, 2017

Related U.S. Application Data

(60) Provisional application No. 62/349,597, filed on Jun. 13, 2016.

(51) Int. Cl.
*G06F 1/16* (2006.01)
*G06F 3/01* (2006.01)
*G02B 27/01* (2006.01)

(52) U.S. Cl.
CPC ......... *G02B 27/0172* (2013.01); *G06F 1/163* (2013.01); *G06F 3/011* (2013.01); *G06F 3/017* (2013.01); *G02B 2027/014* (2013.01)

(58) Field of Classification Search
None
See application file for complete search history.

(56) References Cited

U.S. PATENT DOCUMENTS

| 7,881,901 | B2 | 2/2011 | Fein et al. |
| 8,218,211 | B2 | 7/2012 | Kroll et al. |
| 8,493,206 | B2 | 7/2013 | Richey et al. |

(Continued)

OTHER PUBLICATIONS

StackOverflow ("List nearby/discoverable bluetooth devices", 2013, https://stackoverflow.com/questions/14262315/list-nearby-discoverable-bluetooth-devices-including-already-paired-in-python).*

(Continued)

*Primary Examiner* — Xin Sheng
(74) *Attorney, Agent, or Firm* — Alleman Hall Creasman & Tuttle LLP

(57) ABSTRACT

A head-mounted display (HMD) device may include an at least partially see-through display, one or more location sensors, a communication unit, and a processor. The HMD device may determine at least a location of the one or more location sensors in a physical environment. The communication unit may receive peer location data from at least one peer HMD device in the physical environment. The processor of the HMD device may determine a field of view of the HMD device, identify a display position at which the augmented reality image can be displayed and viewed in the physical environment by the HMD device and the at least one peer HMD device, and display the augmented reality image at the display position on the at least partially see-through display of the HMD device.

20 Claims, 9 Drawing Sheets

(56) References Cited

U.S. PATENT DOCUMENTS

| | | | |
|---|---|---|---|
| 8,854,282 B1 * | 10/2014 | Wong | G06F 3/14 |
| | | | 345/7 |
| 2009/0313584 A1 | 12/2009 | Kerr et al. | |
| 2012/0121126 A1 | 5/2012 | Hwang et al. | |
| 2012/0154277 A1 | 6/2012 | Bar-Zeev et al. | |
| 2012/0249741 A1 * | 10/2012 | Maciocci | G06F 3/011 |
| | | | 348/46 |
| 2012/0327491 A1 | 12/2012 | Ong et al. | |
| 2013/0027318 A1 | 1/2013 | Lection et al. | |
| 2013/0293468 A1 * | 11/2013 | Perez | G06F 3/033 |
| | | | 345/158 |
| 2013/0326364 A1 | 12/2013 | Latta et al. | |
| 2014/0049559 A1 | 2/2014 | Fleck et al. | |
| 2014/0118397 A1 * | 5/2014 | Lee | G06T 7/0057 |
| | | | 345/633 |
| 2014/0347391 A1 | 11/2014 | Keane et al. | |
| 2014/0354685 A1 * | 12/2014 | Lazarow | G02B 27/0172 |
| | | | 345/633 |
| 2014/0368535 A1 | 12/2014 | Salter et al. | |
| 2015/0153571 A1 * | 6/2015 | Ballard | H04W 76/10 |
| | | | 345/8 |

OTHER PUBLICATIONS

Marsella, et al (Jul. 2013 "Virtual character performance from speech", In Proceedings of the 12th ACM SIGGRAPH/Eurographics Symposium on Computer Animation.*

Unt ("Virtual Classroom", Mar. 17, 2016, https://psychology.unt.edu/cns-lab-parsons/simulations/virtual-classroom).*

Sage, "Microsoft's HoloLens launches us into a Future of Holographic Computing", Published on: Jan. 21, 2015, Available at: http://trendytechie.ca/2015/01/21/microsofts-hololens-launches-us-into-a-future-of-holographic-computing/.

* cited by examiner

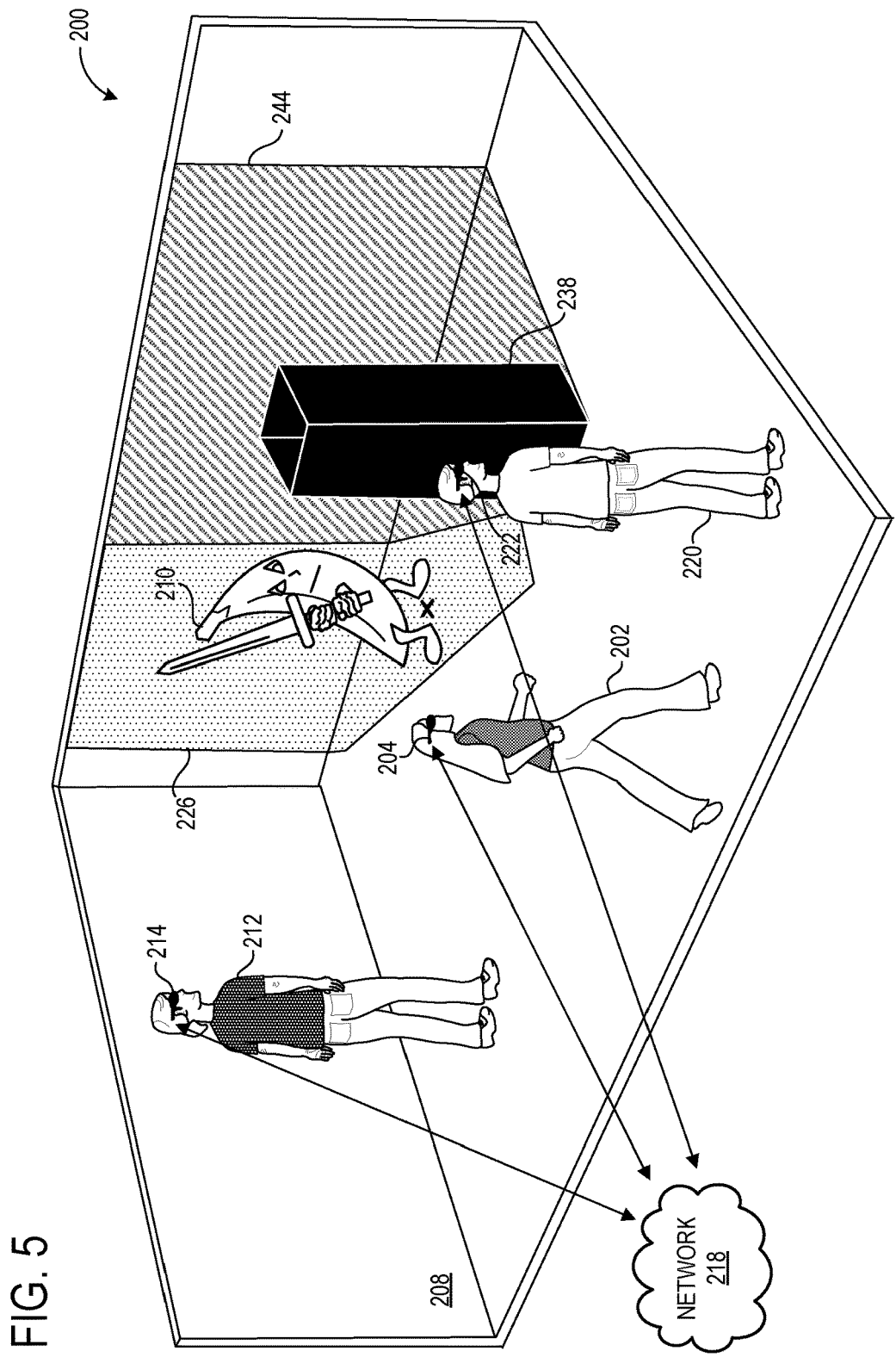

IDENTIFICATION OF AUGMENTED REALITY IMAGE DISPLAY POSITION

CROSS REFERENCE TO RELATED APPLICATIONS

This application claims priority to U.S. Provisional Patent Application No. 62/349,597, filed Jun. 13, 2016, the entirety of which is hereby incorporated herein by reference.

BACKGROUND

Recently, various technologies have emerged that allow users to experience a blend of reality and virtual worlds along an augmented reality continuum. For example, head-mounted display (HMD) devices may include various sensors that allow the HMD device to display a blend of reality and virtual objects on the HMD device as augmented reality, or block out the real world view to display only virtual reality. Whether for virtual or augmented reality, is often desired to present images to multiple users at the same time in order to provide an integrated virtual or augmented reality experience. However, a lack of unification of the images when displaying virtual or augmented reality images to multiple users simultaneously can make the images appear less realistic, which negatively impacts the interactive experience for the users.

SUMMARY

An HMD device, a server, and a method for displaying augmented reality images to be viewed on multiple HMD devices are disclosed herein. In one example, an HMD device comprises an at least partially see-through display configured to display augmented reality images, one or more location sensors from which the HMD device determines at least a location of the location sensors in a physical environment, a communication unit configured to receive peer location data from at least one peer HMD device in the physical environment, and a processor, the processor being configured to determine a field of view of the HMD device, identify a display position at which an augmented reality image can be displayed and viewed in the physical environment by the HMD device and the at least one peer HMD device, and display the augmented reality image at the display position on the at least partially see-through display of the HMD device. This example allows multiple HMD devices to simultaneously view an augmented reality image at a mutually visible location. Thus, ensuring that multiple users of HMD devices can have a realistic cooperative experience.

In another example, the augmented reality image may be a virtual presenter, and the processor of the HMD device may be further configured to display a presentation image at a presentation position, determine a plurality of focal points and animate the virtual presenter to perform a script, wherein the script comprises gestures and focal point information about the plurality of focal points, and the gestures of the virtual presenter depend at least on the focal point information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a three-dimensional view of the computing system of FIGS. 1 and 4 and the example use scenario illustrated in FIG. 4.

DETAILED DESCRIPTION

Figure 1:
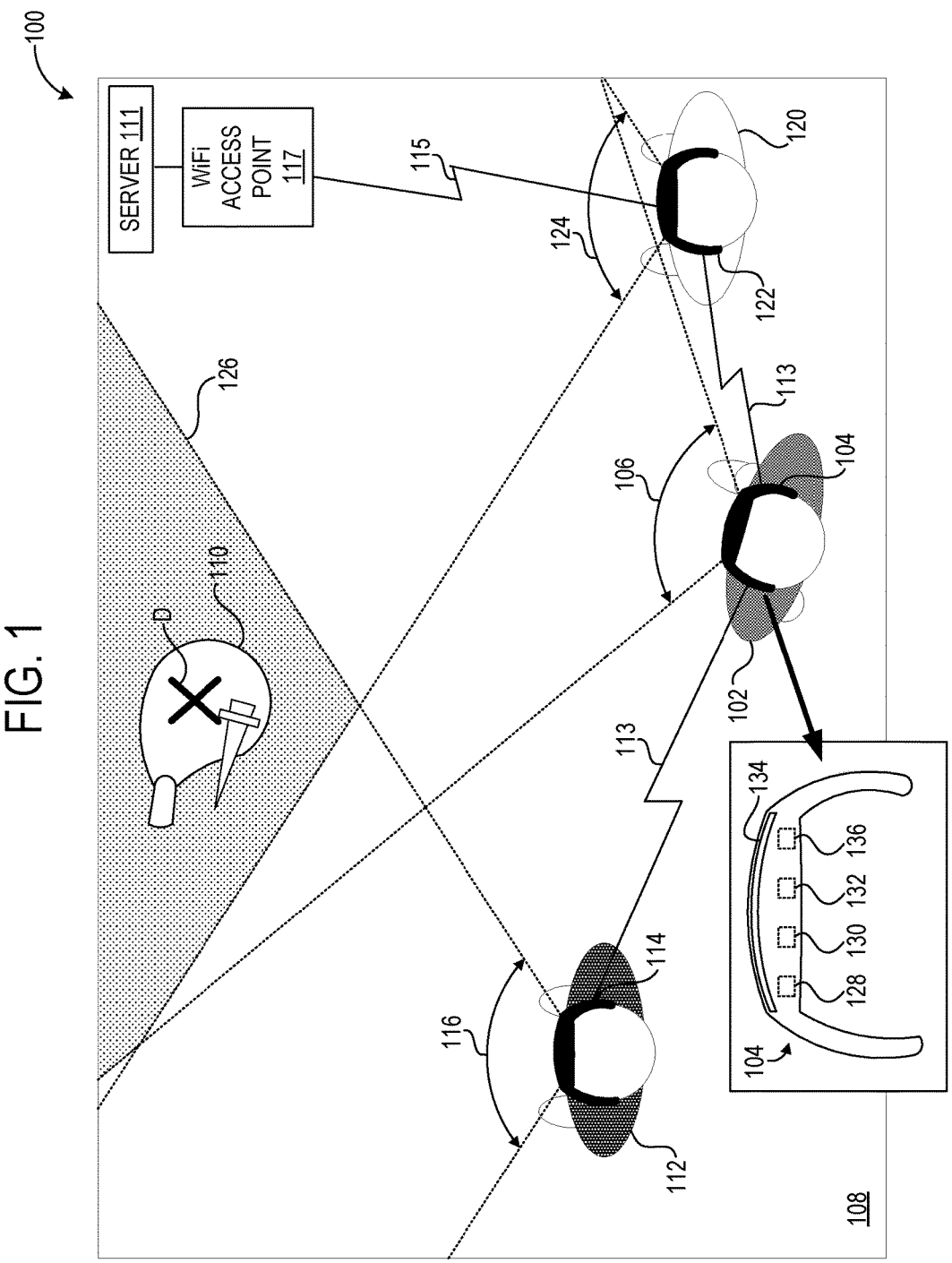
FIG. 1 shows a top view of a computing system including multiple HMD devices according to one embodiment of the present disclosure, used in a first example use scenario.
Figure 2:
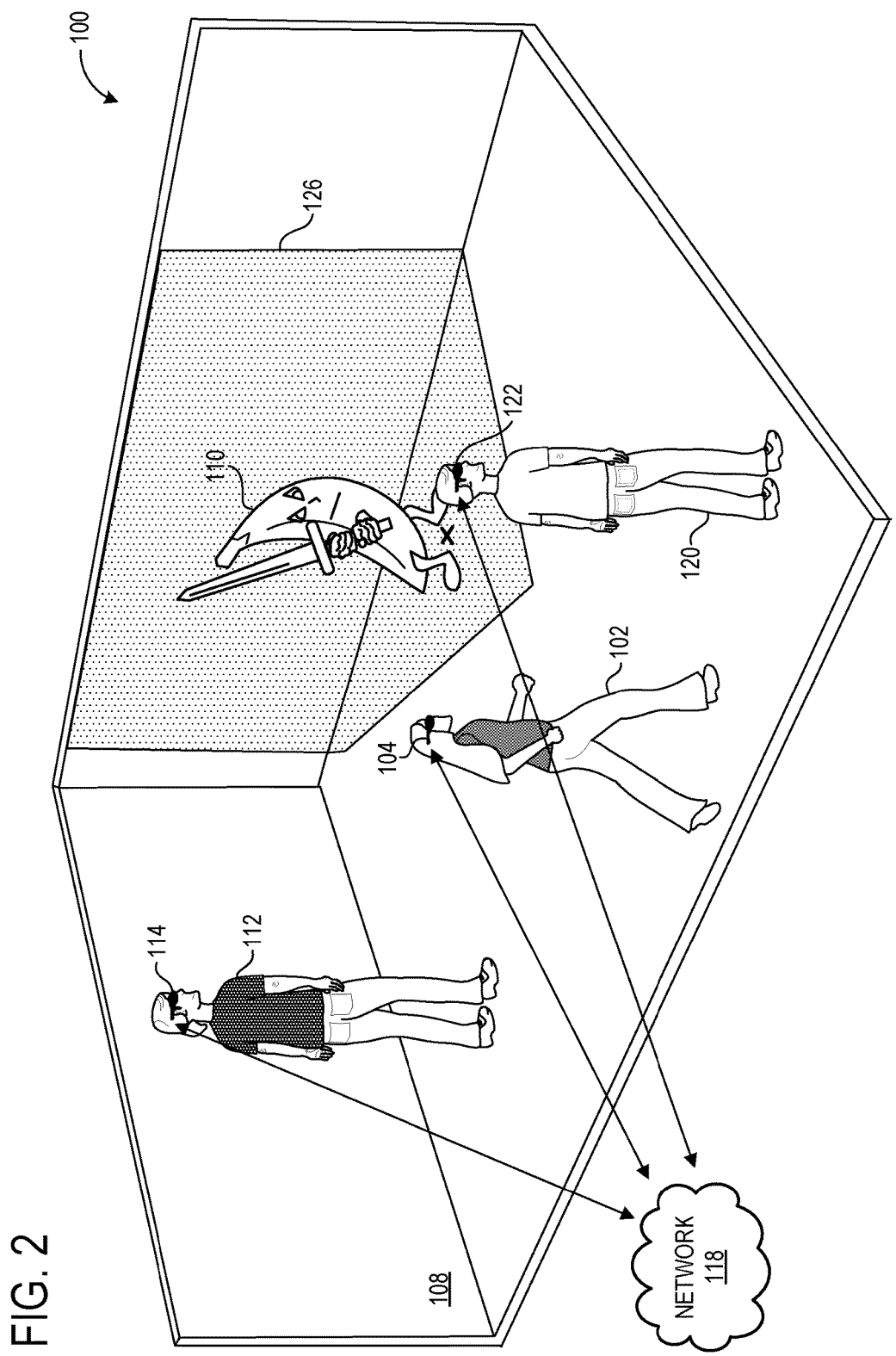
FIG. 2 shows a three-dimensional view of the computing system and example use scenario illustrated in FIG. 1.

As mentioned above, head-mounted display (HMD) devices may present users with collaborative, augmented reality visual experiences. Such experiences may be used for media presentation, teaching, gaming, work/productivity, and many other computing interactions. FIGS. 1 and 2 show an example computing system 100 including an example HMD device 104 worn by a user 102. As illustrated and described in more detail below, HMD device 104 may include one or more location sensors 128, a communication unit 130, a processor 132, an at least partially see-through display 134, and one or more optical sensors 136. The HMD device 104 is configured to mix virtual imagery displayed within a field of view 106, as determined by the HMD device 104, with a real-world physical environment 108. Thus, the field of view 106 is a range within which holographs may be presented, i.e., a holographic field of view. To display the holographic images, the HMD device 104 includes an at least partially see-through display 134 (see also FIG. 3) configured to display an augmented reality image 110, shown here as a sword-wielding banana. This configuration allows the user 102 to view the augmented reality image 110 mixed with the physical environment 108. Furthermore, FIGS. 1 and 2 show that computing system 100 includes a peer HMD device 114 worn by a peer user 112 and having a field of view 116, and a peer HMD device 122 worn by a peer user 120 and having a field of view 124. In the examples described herein, the field of view 106, 116, and 124 of devices 104, 114, and 122 may be used by the computing system 100 to determine a visible area 126 in the physical environment 108 at which to display the augmented reality image 110. The determination may be made by a server 111 of the computing system 100 configured to communicate with the HMD devices, at each of the HMD devices following preset rules, or at designated HMD devices and communicated to the other HMD devices. Once the determination is made, the augmented reality image 110 may be displayed by the HMD devices at a world-locked location referred to as a display position D within the visible area 126, i.e., within the field of view of each of the HMD device 104 and the peer HMD devices 114 and 122.

As described in more detail below, HMD device 104 further comprises one or more location sensors 128, a communication unit 130 and a processor 132, which are used to determine a display position D for the augmented reality image 110. The location sensors 128 are configured to determine at least a location of location sensors 128 in the physical environment 108, and they may also be able to determine a location (X, Y, Z) position as well as orientation (pitch, yaw, and roll) of the location sensors in the physical environment. The communication unit 130 is configured to receive peer location data from the peer HMD devices 114 and 122 in the physical environment 108 and transmit location data about the HMD device 104 to the peer HMD devices 114 and 122, transmission and reception being carried out either directly or indirectly between the HMD device 104 and the peer HMD devices 114 and 122. In some examples, HMD devices 104, 114, and 122 may directly communicate location data to other devices (e.g. via a network 118, Bluetooth, or other suitable protocol) via P2P wireless links 113 to allow the location and orientation of each HMD device 104, 114, and 122 relative to the other devices to be determined. Further, the devices 104, 114, and 122 may send location data to a wireless WiFi access point 117 and server 111 via client-server wireless links 115 in communication with each HMD device 104, 114, and 122 via a network 118, such that server may distribute or otherwise provide the location data from each HMD device to other HMD devices. Although only two P2P wireless links 113 and one client-server wireless link are illustrated for simplicity, it will be appreciated that all HMD devices may communicate via such links 115 with the server in a one to many configuration, and via links 113 with each other in a many to many configuration. In any of the examples described herein, the HMD devices may merge their maps in the same space by packaging up map information (images, features point sets, etc.) and anchor information (locations relative to those feature point sets), and transferring it over the network. Alternatively, map data may be shared ahead of time to get all HMD devices in the same map. Additional dynamic mesh/occlusion data could then be communicated over the network at runtime as the mesh deviated from the initial map.

The processor 132 is configured to determine the field of view 106 of the HMD device 104, identify a display position D at which the augmented reality image 110 can be displayed and viewed in the physical environment 108 by the HMD device 104 and the peer HMD devices 114 and 122 based at least on the determined field of view 106 and the received peer location data, and display the augmented reality image 110 at the display position D on the at least partially see-through display 134 of the HMD device 104.

The HMD device 104 may also include optical sensors 136 and related systems to provide information to the processor 132 about the location and field of view 106 of the user 102 of the HMD device 104. Optical sensors 136, such as one or more outward facing image sensors may include, but are not limited to, depth sensor systems (e.g. time-of-flight and/or structured light camera(s), as well as stereo camera systems), visible light image sensors, and infrared image sensors. In addition to determining the location of the HMD device 104, the one or more location sensors 128 may be further configured to determine an orientation of the HMD device 104. i.e., pitch, yaw, and roll as described above. The location sensors 128 may include, but are not limited to, an inertial measurement unit (IMU).

Data from the optical and location sensors 128 may also be used by the processor 132 to determine direction/location and orientation data (e.g., from imaging environmental features), enabling localization of the HMD device 104 in the real world physical environment 108. Data from the outward facing image sensors may be used by the processor 132 to construct still images and/or video images of the surrounding environment from the perspective of the HMD device 104.

The position and/or orientation of the HMD device 104 relative to the physical environment 108 may be assessed so that augmented-reality images 110 may be accurately displayed in desired locations, and appear to be world-locked, i.e., locked in position relative to the physical environment even as the location and orientation of each HMD device changes. As described below, the processor 132 may be configured to generate a 3D model of the physical environment 108 including surface reconstruction information that may be used to identify surfaces in the physical space. Non-limiting examples of methods to detect geometric planes in the three-dimensional physical environment 108 include the use of algorithms such as linear least squares or random sample consensus (RANSAC) algorithms. The 3D model of the physical environment may be referenced to determine candidate display positions D at which to display a holographic image, structures that may partially obscure a field of view may be identified using the 3D model, and this information taken into account when determining candidate display positions D.

The IMU of HMD device 104 may be configured to provide position and/or orientation data of the HMD device 104 to the processor 132. In one implementation, the IMU may be configured as a three-axis or three-degree of freedom (3DOF) position sensor system. This example position sensor system may, for example, include three gyroscopes to indicate or measure a change in orientation of the HMD device 104 within 3D space about three orthogonal axes (e.g., roll, pitch, and yaw). The orientation derived from the sensor signals of the IMU may be used to display, via the at least partially see-through display 134, one or more augmented reality images 110 with a realistic and stable position and orientation.

In another example, the IMU may be configured as a six-axis or six-degree of freedom (6DOF) position sensor system. Such a configuration may include three accelerometers and three gyroscopes to indicate or measure a change in location of the HMD device 104 along three orthogonal spatial axes (e.g., x, y, and z) and a change in device orientation about three orthogonal rotation axes (e.g., yaw, pitch, and roll). In some implementations, position and orientation data from the outward facing image sensors and the IMU may be used in conjunction to determine a position and orientation (or 6DOF pose) of the HMD device 104.

As introduced above, the HMD device 104 may be configured to determine the field of view 106 of the HMD device 104 based at least on the location and the orientation of the HMD device 104. More specifically, after determining the location and/or orientation of the HMD device 104 in the physical environment 108, the processor 132 of HMD device 104 may be further configured to identify candidate positions at which the augmented reality image 110 can be displayed and viewed within a field of view 106 of the HMD device 104 in the physical environment 108. The HMD device 104 may be configured to establish a coordinate frame for the physical environment 108 via the acquired image data. For example, the coordinate frame may be established from a three-dimensional mesh of the physical environment 108 constructed from depth data acquired via an on-board depth sensor (e.g. by using a simultaneous localization and mapping method). In other examples, the HMD device 104 may obtain previously acquired and stored depth data of the physical environment 108, stored either locally or remotely.

In another example, the optical sensors 136 may be further configured to acquire surface data about surfaces within the field of view 106. Specifically, data from the outward facing image sensors may be used by the processor 132 to generate and/or update a three-dimensional (3D) model of the physical environment 108. Data from the outward facing image sensors may be used by the processor 132 to identify surfaces of the physical environment 108 and/or measure one or more surface parameters of the physical environment 108. The processor 132 may execute instructions to generate/update 3D models and identify surfaces of the physical environment 108 in any suitable manner. In one example, depth maps derived from depth data provided by the depth camera of outward facing image sensor may be used to generate/update 3D models and identify surfaces of the physical environment 108.

Figure 3:
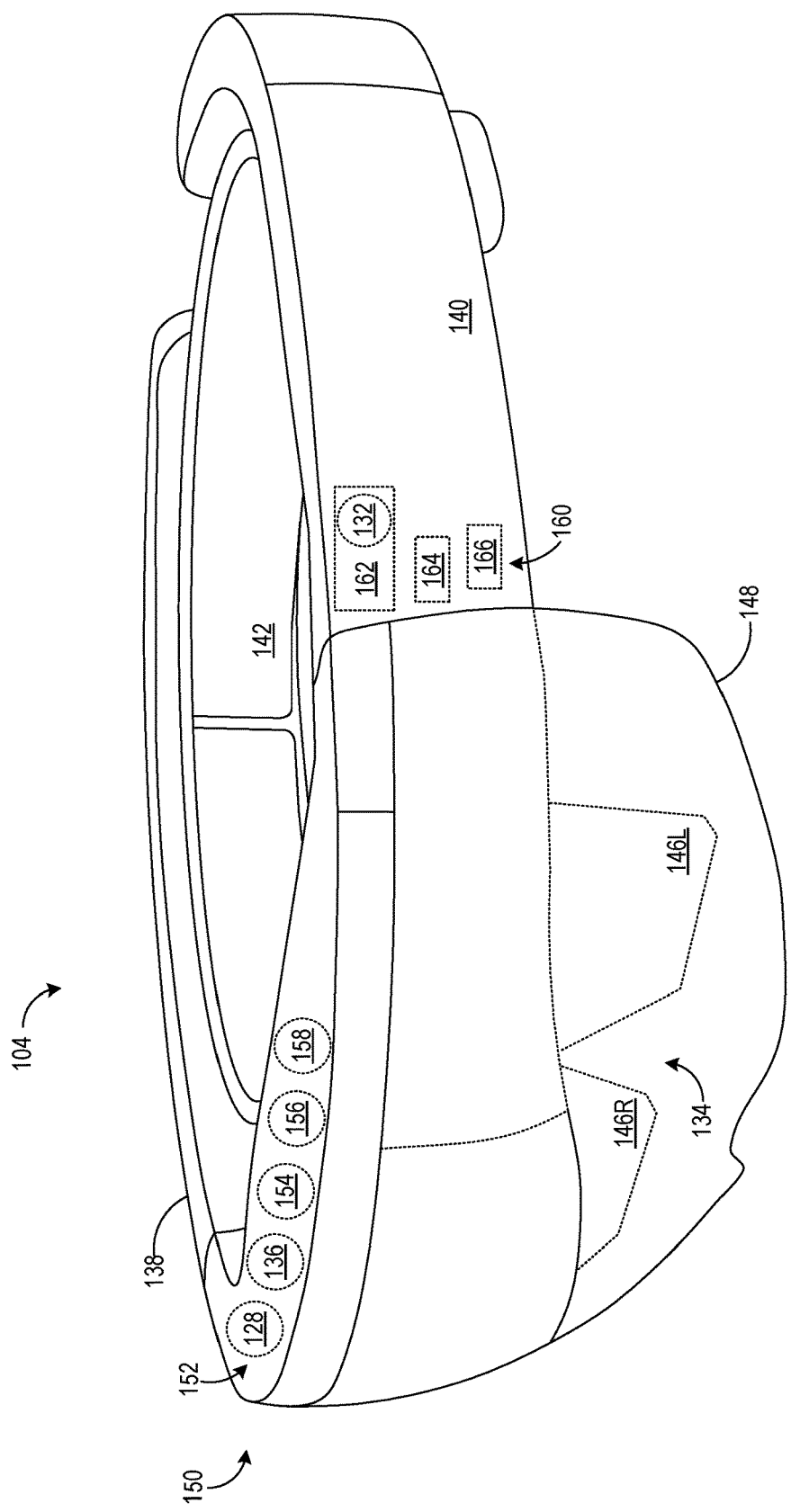
FIG. 3 shows a schematic illustration of an HMD device.

FIG. 3 shows a detailed schematic of a physical embodiment of the example HMD device 104 described above as part of computing system 100. The illustrated HMD device 104 takes the form of a wearable visor, but it will be appreciated that other forms are possible, such as glasses or goggles, among others. The HMD device 104 may include a housing 138 including a band 140 and an inner band 142 to rest on a user's head. The HMD device 104 may include the at least partially see-through display 134. The at least partially see-through display 134 may be a stereoscopic display and may include a left panel 146L and a right panel 146R as shown, or alternatively, a single panel of a suitable shape. The panels 146L, 146R are not limited to the shape shown and may be, for example, round, oval, square, or other shapes including lens-shaped. The HMD device 104 may also include a shield 148 attached to a front portion 150 of the housing 138 of the HMD device 104. The at least partially see-through display 134 and/or the shield 148 may include one or more regions that are transparent, opaque, or semi-transparent. Any of these portions may further be configured to change transparency by suitable means. As such, the HMD device 104 may be suited for both augmented reality situations and virtual reality situations.

A controller 160 of the HMD device 104 may include a logic subsystem 162, a storage subsystem 164, and a communication subsystem 166. The logic subsystem 162 may include one or more processors 132 configured to execute software instructions. Logic subsystem 162, storage subsystem 164, and communication subsystem 166 are described in more detail below in regard to FIGS. 8 and 9.

The processor 132 of the HMD device 104 is operatively coupled to the display panels 146R and 146L and to other display-system componentry. The processor 132 includes logic and associated computer memory configured to provide image signals to the display panels 146R and 146L, to receive sensory signals from a sensor system 152, and to enact various control processes described herein. The sensor system 152 may include one or more location sensors 128, one or more optical sensors 136, a gaze detection system 154, one or more microphones 156, as well as one or more speakers 158. The processor 132 may be further configured to provide signals to the sensor system 152.

Figure 4:
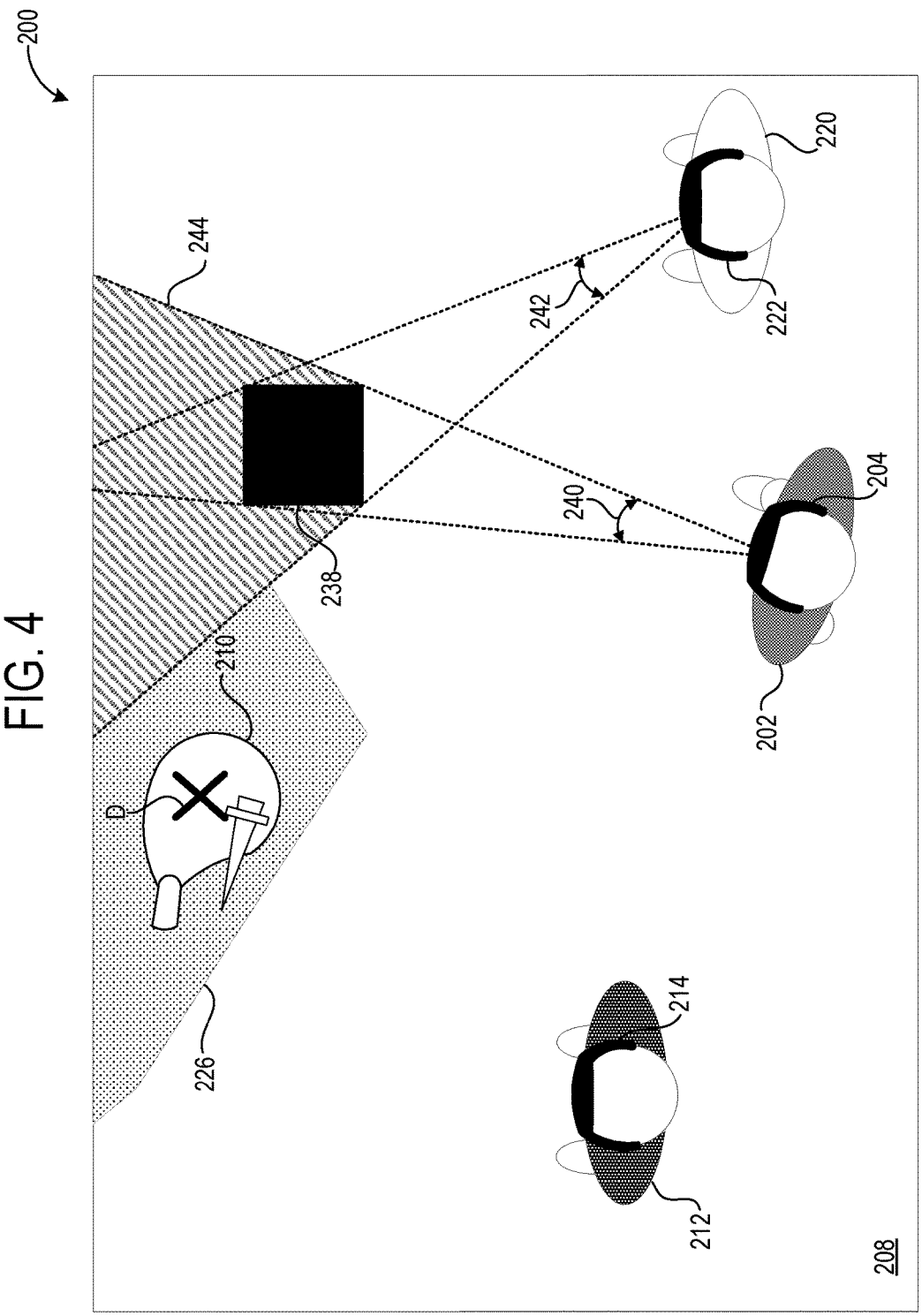
FIG. 4 shows a top view of the computing system of FIG. 1, illustrating an example use scenario in a physical environment containing a physical object visually occluding a field of view of one or more of the HMD devices.

Turning now to FIGS. 4 and 5, an additional example use scenario 200 of the HMD device 204 disclosed herein are discussed. Since the example use scenario of the HMD device 204 is generally similar to that described in FIGS. 1 and 2, with the exception of a physical object 236 visually occluding the field of view of the HMD device 204, detailed description thereof is abbreviated. It is to be noted that like parts are designated by like reference numerals throughout the detailed description and the accompanying drawings.

In this example, data from the outward facing image sensors may be used by the processor 232 to determine the location and orientation of a physical object 238 in the physical environment 208 that occludes the field of view of the user 202 of the HMD device 204. FIG. 4 shows the occluded range 240 of the field of view of HMD device 204, as well as the peer occluded range 242 of the peer field of view of peer HMD device 222. As described in more detail below, in some examples the HMD device 204 may use information about the physical object 238, as well as about a visually occluded area 244, to refine the visible area 226 in the physical environment 208 that represents the field of view of the HMD device 204 not visually occluded by the physical object 238. Thus ensuring that augmented reality image 210 is displayed at a display position D visible to the user 202 of the HMD device 204 as well as users 212 and 212 of peer HMD devices 214 and 222.

An HMD device according to any examples described herein may further include any other suitable location-sensitive input devices than optical sensors, such as a directional microphone array or other location-sensitive acoustic input sensor. Additionally, although FIG. 1 illustrates a head-mounted device to display augmented reality images according to an example of the present disclosure, an HMD display device may take any other suitable form than a head-mounted display device with a see-through display. For example, an HMD device may be implemented as a virtual reality head-mounted display with an opaque screen and an outward-facing camera configured to display video from the outward-facing camera composited with virtual imagery. Also, the techniques described herein may be applied to a non-wearable mobile display device configured to display virtual content via a viewfinder mode when in close enough proximity to a head of a user to be viewed. In other examples, an HMD device may take any other suitable form in which an at least partially see-through display is supported in front of a viewer's eye or eyes.

Additionally or alternatively, information from outward facing image sensors and/or other sensors may be communicated to a remote computing device, such as server 111 in FIG. 1, responsible for generating and updating a model of the physical space. The HMD device may be communicatively coupled to remote computing device and/or other device(s) via a wired connection or a wireless connection to a network, such as is enabled by WiFi access point 117. In some examples, the network may take the form of a local area network (LAN), wide area network (WAN), wired network, wireless network, personal area network, or a combination thereof, and may include the Internet.

Referring to FIG. 1, identification of peer HMD devices 114 and 122 in the physical environment 108 will be described in more detail. The HMD device 104 may discover the presence, identity and/or location of one or more proximal HMD devices via acquired data (e.g., network communications data, image data, audio data, etc.) in order to communicate with the proximal HMD devices. In one example, the HMD device 104 may detect the proximal HMD devices via a wireless network, such as via a WiFi or Bluetooth network. Once a wireless network connection has been established over a WLAN or WPAN, for example, the communication unit 130 of the HMD device 104 may be configured to transmit an enumeration request over the wireless network to determine if the one or more proximal HMD devices are in the physical environment 108 and receive an enumeration response from the one or more proximal HMD devices indicating that the one or more proximal HMD devices are located in the physical environment 108. The enumeration response may include an identifier and network address of the responding device, and optionally a position of the responding device within the physical environment. Once the proximal HMD devices are enumerated over the wireless network, HMD device 104 may send a request for a beaconing signal to each of the enumerated HMD devices, causing each proximal HMD device, in turn, to emit a beaconing signal. The beaconing signal may be optical (typically, a non-visible light such as infrared light), or may be a sound having a frequency that is not audible to humans. The beaconing signal may be used by each receiving HMD device to confirm the position of enumerated HMD devices in the physical environment. This beaconing signal is received from the one or more proximal HMD devices, and the HMD device 104 may transmit an acknowledgement response to the beaconing signal to the one or more proximal HMD devices.

In some situations, the number of HMD devices may be great, the physical environment 108 large, and/or HMD devices may be nearby that are not in the same physical environment 108, such as in an adjacent room. In these situations, it is not desirable for each HMD device to connect to each other HMD device that is discovered to be present on a wireless network. Rather, in such situations, each HMD device may seek to define a subset of peer HMD devices among all detected HMD devices with which position information will be exchanged for the purpose of determining an acceptable common viewing display position. Accordingly, the processor 132 may be further configured to identify at least one peer HMD device 114 and 122 from the one or more proximal HMD devices based on one or more logical constraints that are used to define the peer group. The one or more logical constraints may include, but are not limited to, at least one of: the one or more proximal HMD devices being within a predetermined distance of the determined location of the HMD device 104, the one or more proximal HMD devices being within a predetermined area relative to the HMD device 104, the one or more proximal HMD devices belonging to a predetermined group with the HMD device 104, and the one or more proximal HMD devices joining a peer group upon detection as a proximal HMD device.

Upon identification of the at least one peer HMD device 114 and 122, the communication unit 130 of the HMD device 104 may be configured to receive peer location data from at least one peer HMD device 114 and 122 in the physical environment 108 and transmit location data about the HMD device 104 to the at least one peer HMD device 114 and 122. The peer location data may include, but are not limited to, at least one of: the field of view 116 and 124 of the peer HMD devices 114 and 122, surface data about surfaces within the field of view 116 and 124 of the peer HMD devices 114 and 122, and candidate positions at which the augmented reality image 110 may be displayed and viewed in the physical environment 108 by the HMD device 104 and the at least one peer HMD device 114 and 122. Based on the received peer location data, the HMD device 104 may assign and store device locations for the at least one peer HMD device 114 and 122 within the coordinate frame established by the HMD device 104 for the physical environment 108. It is understood that the location data of the HMD device 104 and the peer location of the at least one peer HMD device 114 and 122 may be mapped in either a 'world space' or a 'head space.' In the 'world space' the location data and peer location data may be marked with a transform relative to known locations in the coordinate frame for the physical environment 108, such as known map locations. In the 'head space' the location data and peer location data may be marked relative to the HMD device 104 and the at least one peer HMD devices 114 and 122, respectively.

As an example, the received peer location data may include peer surface data about surfaces within a peer field of view 116 and 124 of the at least one peer HMD device and may be stored, for example, as a three-dimensional mesh of the physical environment 108, or the received peer location data may include peer candidate positions at which the augmented reality image 110 can be displayed and viewed in the physical environment 108 by the at least one peer HMD device 114 and 122 and stored as a list of candidate coordinates in the physical environment 108 at which the augmented reality image 110 may be displayed.

When the candidate positions comprise a list of candidate coordinates, each coordinate may represent a single point in the physical environment 108, a two-dimensional area on a surface in the physical environment 108, or a three-dimensional area in the physical environment 108. Additionally, each of these coordinate lists may further be associated with an acceptable deviation of the candidate position from the candidate coordinate. For example, in a case where a list of candidate coordinates is represented by single points in the physical environment 108, a one-, two-, or three-dimensional deviation from that point may be allowable when calculating compatible positions, as described below. The peer location data further may comprise information regarding physical objects in the physical environment 108 that may visually occlude an augmented reality image 110. Alternatively, this physical object information may be incorporated into the peer surface data and/or the peer candidate positions prior to receipt of the peer location data by the HMD device 104. To enable comparison across HMD devices, the peer location data of the peer HMD devices 114 and 122 and the location data of the HMD device 104 may further include packaged map information (such as images, features point sets, etc.) and anchor information (such as locations relative to the feature point sets). This packaged map information and anchor information may then be merged to standardize coordinate frames of the physical environment 108 across all HMD devices. Alternatively, map data about the physical environment 108 may be communicated between the HMD device 104 and the peer HMD devices 114 and 122 ahead of time to standardize the coordinate frame of the physical environment 108 across all HMD devices, and additional dynamic surface data and/or occlusion data could then be communicated over the network at runtime as the surface data deviated from the initial map.

To facilitate a shared viewing experience, the HMD device 104 may also be configured to identify compatible positions at which the augmented reality image 110 can be displayed and viewed in the physical environment 108 by the HMD device 104 and the at least one peer HMD device 114 and 122. As such, in the example described above in which the received peer location data comprises peer candidate positions, the processor 132 may be further configured to compare the peer candidate positions of the one or more peer HMD devices to the candidate positions of the HMD device 104 and determine overlapping positions visible by both the HMD device 104 and the at least one peer HMD device 114 and 122. These overlapping positions are positions within visible area 126, which is the shaded region in FIG. 1. The compatible positions may be selected to be of sufficient size to display a predetermined augmented reality image 110. Furthermore, the processor 132 may be configured to select a display position D from the compatible positions based on one or more logical constraints. Example logical constraints that may be used to select the display position D include, but are not limited to, a surface having a size and/or shape that can fit the augmented reality image 110 (e.g., a stage on which a virtual presenter can be positioned), a surface type that is compatible with an augmented reality image type or characteristic (e.g. a wall for display of a virtual poster, a floor or stage for a standing presenter, a chair for a seated presenter, a table for a virtual object), a position that is the most equidistant from the device locations for each of the HMD device 104 and the peer HMD devices 114 and 122, and/or or any other suitable logical constraint. It will be understood that an augmented reality image 110 may appear to be "snapped to" a suitable selected surface and/or feature of the physical environment 108, and its movement constrained.

In another example described above in which the peer location data comprises peer surface data about surfaces within a peer field of view, the processor 132 may be further configured to create a union of the surface data of the HMD device 104 and the received peer surface data of the one or more peer HMD devices 114 and 122 to determine overlapping positions in the physical environment 108 visible by both the HMD device 104 and the at least one peer HMD device 114 and 122. This union may be represented by a mesh reconstruction of the physical environment 108 and include information about potential display surfaces and visually occluding objects, such as physical object 238 described above. Furthermore, the processor 132 may be configured to select the display position D from the compatible positions based on one or more logical constraints. In addition to the logical constraints described above for selecting the display position D from compatible positions identified from peer location data comprising peer candidate positions, example logical constraints may further include an unoccupied surface as opposed to a cluttered surface, a center of the largest surface in the physical environment 108 (e.g. the center of a table or stage), and/or a surface which is the most equidistant from all of the device locations.

In short, based at least on the determined field of view 106 of HMD device 104 and the received location data of peer HMD devices 114 and 122, the processor 132 is configured to identify a display position D at which the augmented reality image can be displayed and viewed in the physical environment 108 by the HMD device 104 and the at least one peer HMD device 114 and 122. Although, the display position D shown in FIG. 1 is a single point, the display position D may also be a two-dimensional or three-dimensional area. While typically processor 132 computes the display position D itself, as described elsewhere herein, processor 132 may identify the display position by downloading it from server 111, or receiving it from another HMD device in other embodiments.

Further, the processor 132 of the present disclosure is further configured to display the augmented reality image 110 at the display position D on the at least partially see-through display 134 of the HMD device 104. The size of the displayed augmented reality image 110 may vary, since the relative aspect ratios of the augmented reality image 110 and the HMD field of view 106 may vary depending upon an apparent distance from the HMD device 104 at which the augmented reality image 110 is to appear when displayed. Thus, in some examples, the HMD device 104 may be configured to position the augmented reality image 110 at a preselected virtual distance from the HMD device 104 for comparing the dimensional information of the augmented reality image 110 and the HMD field of view 106. Positioning the augmented reality image 110 in this way may prevent the augmented reality image 110 from being displayed either too large or too small for the user 102 of the HMD device 104 to view comfortably and/or completely.

In some examples, a 6DOF position sensor system may be used to display the augmented reality image 110 in a world-locked manner after the display position D has been identified, as described above. As discussed briefly above, a world-locked augmented reality image 110 appears to be fixed relative to one or more real world objects viewable through the HMD device 104, thereby enabling a user 102 of the HMD device 104 to move around a real world physical environment 108 while perceiving a world-locked augmented reality image 110 as remaining in a fixed location relative to the one or more real world objects in the physical environment 108.

It is understood that, since the same location data is transmitted between the HMD device and the one or more peer HMD devices 114 and 122, an equivalent determination of a display position D may also be carried out in each of the peer HMD devices 114 and 122. For example, peer HMD 114 may receive location data from HMD device 104 and peer HMD device 122. However, from a perspective of peer HMD device 114, HMD device 104 and peer HMD device 122 are both peer HMD devices, and peer HMD device 114 is the HMD device. Since the same location data is used by all of the devices 104, 114. And 122, and the calculations are equivalent, each device 104, 114. And 122 may independently determine the same set of compromise positions and the same display position D. Thus, the one or more peer HMD devices 114 and 122 and the HMD device 104 may display the augmented reality image 110 at the same display position D in the physical environment 108. Alternatively, a central processing strategy utilizing server 111, or a super node processing strategy utilizing HMD devices designated as super nodes within a mesh network of HMD devices may be utilized such that only server 111 or only HMD devices designated as super nodes perform the calculations to identify display position D.

Figure 6A:
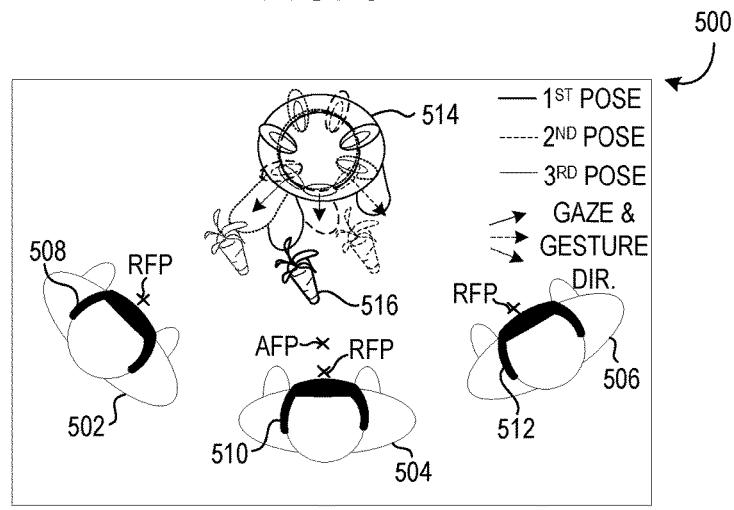
FIGS. 6A, 6B, 6C and 6D show the computing system of FIG. 1, in a third example use scenario in which the augmented reality image is a virtual presenter.

In some examples of the HMD device disclosed herein, the augmented reality image displayed at the display position by the HMD device may be a virtual presenter, such as an animated image or likeness of a person, robot, creature, or other object. As one non-limiting example, FIG. 6A shows a multi-user scenario 500 in which users 502, 504, and 506 wearing HMD devices 508, 510, and 512, respectively, each view a virtual presenter 514, shown here as a rabbit. In some examples, the processor of the HMD device may also be configured to display a presentation image 516, shown here as a carrot, at a presentation position, where the presentation position may be based on the location, the display position, and an area occupied by the virtual presenter. Additionally, the presentation image is preferentially a second augmented reality image to be displayed in addition to the augmented reality image, the presentation image having substantially similar display properties as the augmented reality image, as described above. Further, the presentation position may be different for each of the HMD devices 508, 510 and 512. For example, the presentation position may be chosen to be located at predefined distance from the virtual presenter 514 along a line between the virtual presenter 514 and each of the HMD devices 508, 510, and 512. This would require the presentation position to be translated to the left in the field of view for HMD device 508 relative to the presentation position shown in FIG. 6B, and would require the presentation position to be translated to the right in the field of view for HMD device 512 relative to the presentation position shown in FIG. 6D. However, according to this example, the presentation position would remain the same for HMD device 510 as it is shown in FIG. 6C.

Figure 6B:
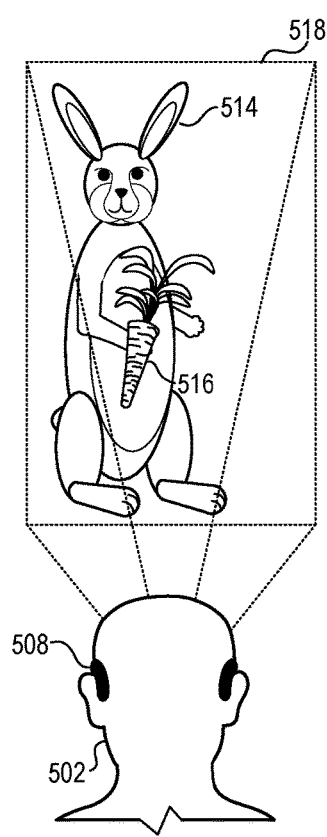
Figure 6C:
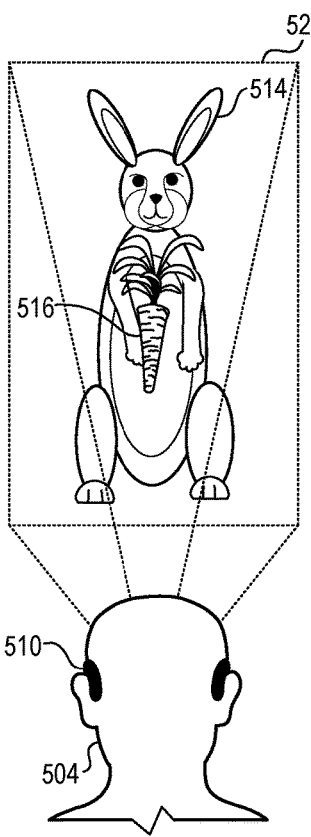
Figure 6D:
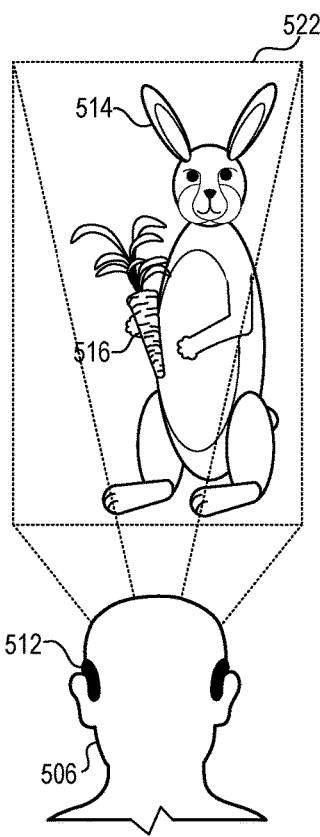

As depicted in FIGS. 6B-6D, if the virtual presenter is displayed in a fixed orientation at the display position for all HMD devices 508, 510, and 512, then each of the users 502, 504, and 506 may view the virtual presenter 514 from a different viewing angle 518, 520, and 522. In some cases, although it may be advantageous for the multiple users 502, 504, and 506 to display the augmented reality image 514 at a mutual display position, as described above, it may also be advantageous for each of the users 502, 504, and 506 to view the augmented reality image from the same orientation. To accomplish this, the processor may be configured to determine a plurality of focal points based at least on one of: the display position, the presentation position, the location of the one or more location sensors, and the peer location data; and animate the virtual presenter to perform a script, wherein the script comprises gestures and focal point information about the plurality of focal points, and the gestures of the virtual presenter depend at least on the focal point information. Examples of focal points include, but are not limited to, the presentation position, the location of each HMD device, a central point between the virtual presenter and all HMD devices, and a predetermined primary HMD device. Examples of gestures may include, but are not limited to, orienting a torso toward a focal point, orienting a head and gaze toward a focal point, orienting a hand gesture such as pointing toward a focal point, directing speech toward a focal point, or other gesticulation of a body part to convey meaning.

Referring again to FIGS. 6A-6D, one example of a gesture to be performed by the virtual presenter 514 during a script may be controlling a torso, gaze, and hand gesture orientation of the virtual presenter 514. As illustrated, a torso of the virtual presenter may be oriented to face towards a central focal point, referred to as an absolute focal point (AFP), between the virtual presenter and all of the HMD devices 508, 510, and 512. According to this defined torso orientation, which is applied to the views of all HMD devices, the torso in each of FIGS. 6B-6D appears to face in a different direction due to the different perspective of each HMD device. Nevertheless, it will be appreciated that the torso faces in the same orientation as viewed from the top in FIG. 6A since it is programmed to face toward the absolute focal point (AFP), which is world-locked. On the other hand, in this example a gaze orientation and a hand gesture orientation of the scripted virtual presenter are each assigned a relative focal point (RFP) that is defined relative to the position and orientation of each viewing HMD device, thereby causing, in this example, the face and arm to be oriented toward each respective HMD device, as is shown in FIGS. 6A-6D. For simplicity of explanation, in this example, the gaze orientation and gesture orientation for each HMD device are assigned the same relative focal point, which is defined relative to the position of the respective HMD device. This results in the gaze facing each HMD device, and the arm being extended towards each HMD device in the same direction. Alternatively, two different RFPs could be assigned to the gaze orientation and gesture orientation. Further, the position of the object in presentation image 516 (a carrot in this example) is also determined based on the RFP for each HMD device. With such a system, each user sees the virtual presenter positioned in the same location with a torso (including legs and feet in this example) in the same orientation, for a common, shared experience of the presenter, yet each user also sees a user-specific animation of the virtual presenter with gaze orientation, gesture orientation, and object positioning tailored to the specific viewing angle of the user, which lends a more personalized feel to the shared experience. This system allows all of the users to receive equivalent communicated content from the virtual presenter 514, with full view of the hand gestures and facial expressions, while displaying the virtual presenter at a mutually visible location with common torso orientation, allowing for a personalized, yet shared experience for the multiple HMD device users 502, 504, and 506. Further, it will be appreciated that the presentation image 516 need not be static, but may be animated, and further the display position D need not be fixed but may be dynamically adjusted over time. In this way a virtual presenter may be animated to walk around the shared visible area 126, 226 according to a script. Further, as the positions of the HMD devices changes, the visible area 126, 226 definition may be updated and the script dynamically altered to prevent movement outside of the updated visible area, or if the virtual presenter is already positioned outside of the visible area 126, 226 to programmatically cause the virtual presenter to walk back in an animated manner into the updated visible area.

Figure 7:
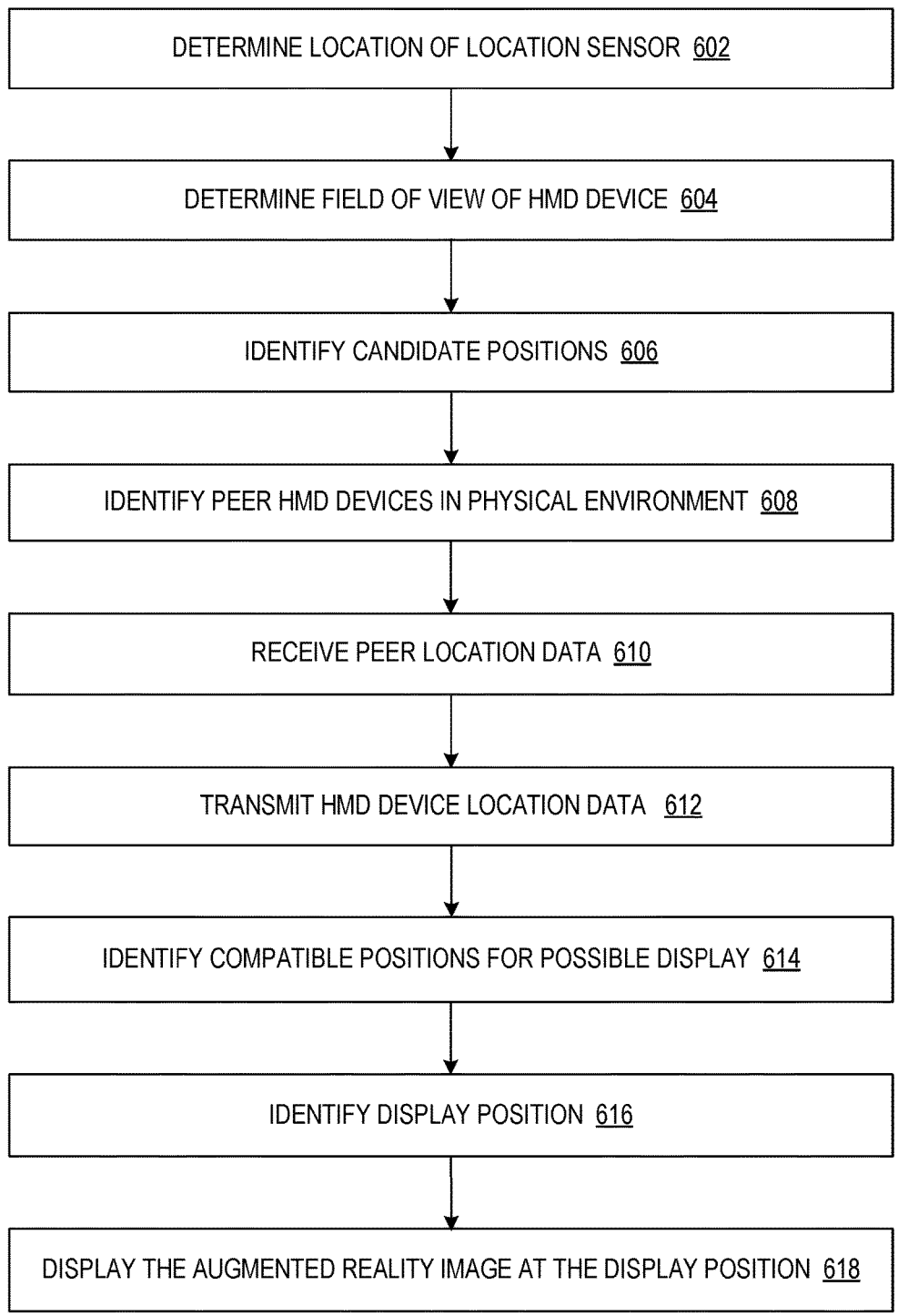
FIG. 7 is a flowchart illustrating example method to identify a display position visible by multiple HMD devices at which to display an augmented reality image, according to one embodiment of the present disclosure.

FIG. 7 shows a flow diagram depicting an example method 600 implemented at least in part by a head-mounted display (HMD) device for identifying a display position at which to display an augmented reality image visible by the HMD device and one or more peer HMD devices. The following description of method 600 is provided with reference to the software and hardware components described above and shown in FIGS. 1-5. It will be appreciated that method 600 also may be performed in other contexts using other suitable hardware and software components.

At 602, the method may include determining a location of one or more location sensors of an HMD device in a physical environment. Additionally, an orientation of the HMD device may be determined via the location sensors and/or optical sensors. At 604, the method may include determining a field of view of the HMD device. At 606, the method may include identifying candidate positions at which the augmented reality image may be displayed and viewed within the field of view of the HMD device. At 608, the method may include identifying peer HMD devices of the subject HMD device in the physical environment. To identify peer HMD devices, a subject HMD device may send an enumeration request to discover HMD devices over a wireless network, and may apply one or more logical constraints, as discussed above. Once the peer HMD devices are identified, at 610 the method may include, at the HMD device receiving peer location data from the at least one peer HMD device in the physical environment via a communication unit of the HMD device, and at 612, as well as transmitting location data about the HMD device to the at least one peer HMD device via the communication unit. In any of the communication steps, the HMD device may communicate directly with the peer HMD devices, or the HMD device may be connected to an external computing system, such as a server, via a network, and the external computing device may instead transmit communications between the devices.

Continuing with method 600, at 614, the method may include identifying compatible positions at which the augmented reality image can be displayed and viewed in the physical environment by the HMD device and the at least one peer HMD device. Any suitable localization method may be used. As a non-limiting example, the processor of the HMD device may compare peer candidate positions of the one or more peer HMD devices, received as a part the peer location data, to the candidate positions of the HMD device identified above, and identify the candidate positions as overlapping positions visible by both the HMD device and the at least one peer HMD device. In another example, the optical sensors of the HMD device may acquire surface data about surfaces within the field of view, and the processor of the HMD device may be configured to create a union of surface data of the HMD device and the received peer surface data of the one or more peer HMD devices, received as a part the peer location data, and identify the candidate positions as overlapping positions in the physical environment visible by both the HMD device and the at least one peer HMD device.

At 616, HMD device may, based at least on the determined field of view and the received peer location data, identify a display position at which an augmented reality image can be displayed and viewed in the physical environment by the HMD device and the at least one peer HMD device with the processor. The display position may be selected from the compatible positions based on one or more logical constraints, as described in detail above. At 618, the HMD device may display the augmented reality image at the display position on an at least partially see-through display of the HMD device. It will be appreciated that the received peer location data and transmitted location data are also available to the peer HMD devices. Therefore, each of the peer HMD devices may carry out an analogous method to determine the display position which will result in display of the augmented reality image at the same position in the physical environment as that of the HMD device. Alternatively, the display position may be determined by an external computing device, such as a server, and transmitted to both the HMD device and the one or more peer HMD devices, or the HMD device may exert a super node relationship as compared to the peer HMD devices and directly transmit the display position to the one or more peer HMD devices. Importantly, in each of these examples, the HMD device and the one or more peer HMD devices will display an augmented reality image at the same position in the physical environment.

In another non-limiting example, the method may include displaying the augmented reality image as a virtual presenter. Further, the method may include identifying a presentation position at which a presentation image can be displayed and viewed in the physical environment by the HMD device with the virtual presenter, where the presentation position is based at least on the location of the HMD device, the display position, and an area occupied by the virtual presenter. Based at least on one of: the display position, the presentation position, the location of the one or more location sensors and the peer location data, the method may further include determining a plurality of focal points and displaying the presentation image at the presentation position on the at least partially see-through display of the HMD device. Finally, the method may further include animating the virtual presenter to perform a script, wherein the script includes gestures and focal point information about the plurality of focal points, and the gestures of the virtual presenter depend at least on the focal point information. It will be appreciated that the augmented reality image may be a virtual presenter without the identification of a presentation position or the display of a presentation image by the HMD device.

In any of the examples disclosed herein, the communication unit of the HMD device of the present disclosure may be further configured to determine that an additional HMD device has entered the physical environment and receive additional location data from the additional HMD device. Additionally, the processor of the HMD device may be further configured to transmit an instruction, either directly or indirectly, to the additional HMD device indicating an unoccupied position nearest to the additional HMD device at which the augmented reality image displayed at the display position can be viewed by the additional HMD device. This allows for the additional HMD device to join a viewing experience after it has begun, without disrupting the visual display of augmented reality images for the original HMD devices.

It will be appreciated that the server may be configured to control augmented reality image localization for multiple HMD devices. In this example, the server may include memory to store a representation of a physical environment and a processor. The processor of the server may be configured to receive location data from the HMD devices in the physical environment, determine a field of view each of the HMD devices, identify a display position at which an augmented reality image can be displayed and viewed in the physical environment by all of the HMD devices based on at least on the determined field of view and the received location data, and propagate the display position back to the HMD devices to cause display of the augmented reality image at the display position on an at least partially see-through display of each of the HMD devices.

The server may be further configured such that the augmented reality image is a virtual presenter, and the processor of the server may be configured to determine a plurality of focal points based at least on one of: the display position and the location data. In some examples, the processor may be further configured to identify a plurality of presentation positions at which a presentation image can be displayed and viewed in the physical environment by each of the HMD devices with the virtual presenter, based at least on the location data, the display position, and an area occupied by the virtual presenter. In this example, the processor may determine the plurality of focal points based at least on one of: the display position, the plurality of presentation positions and the location data.

For each example in which the augmented reality image is a virtual presenter, the processor of the server may be further configured to create an animation of the virtual presenter to perform a script, wherein the script comprises gestures and focal point information about the plurality of focal points, and the gestures of the virtual presenter depend at least on the focal point information. Additionally, the processor may be further configured to propagate the animation back to each of the HMD devices to cause animation of the virtual presenter on the at least partially see-through display of each of the HMD devices. In the examples in which the processor is configured to identify a plurality of presentation positions, the processor may also be configured to propagate the plurality of presentation positions back to each of the HMD devices to cause display of the presentation image at one of the plurality of presentation positions on the at least partially see-through display of each of the HMD devices.

It will further be appreciated that method 600 is provided by way of example and is not meant to be limiting. Therefore, it is to be understood that method 600 may include additional and/or alternative steps relative to those illustrated in FIG. 7, and all or some steps of method 600 may be repeated for identifying any additional devices within the environment. Further, it is to be understood that method 600 may be performed in any suitable order. Further still, it is to be understood that one or more steps may be omitted from method 600 without departing from the scope of this disclosure. In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
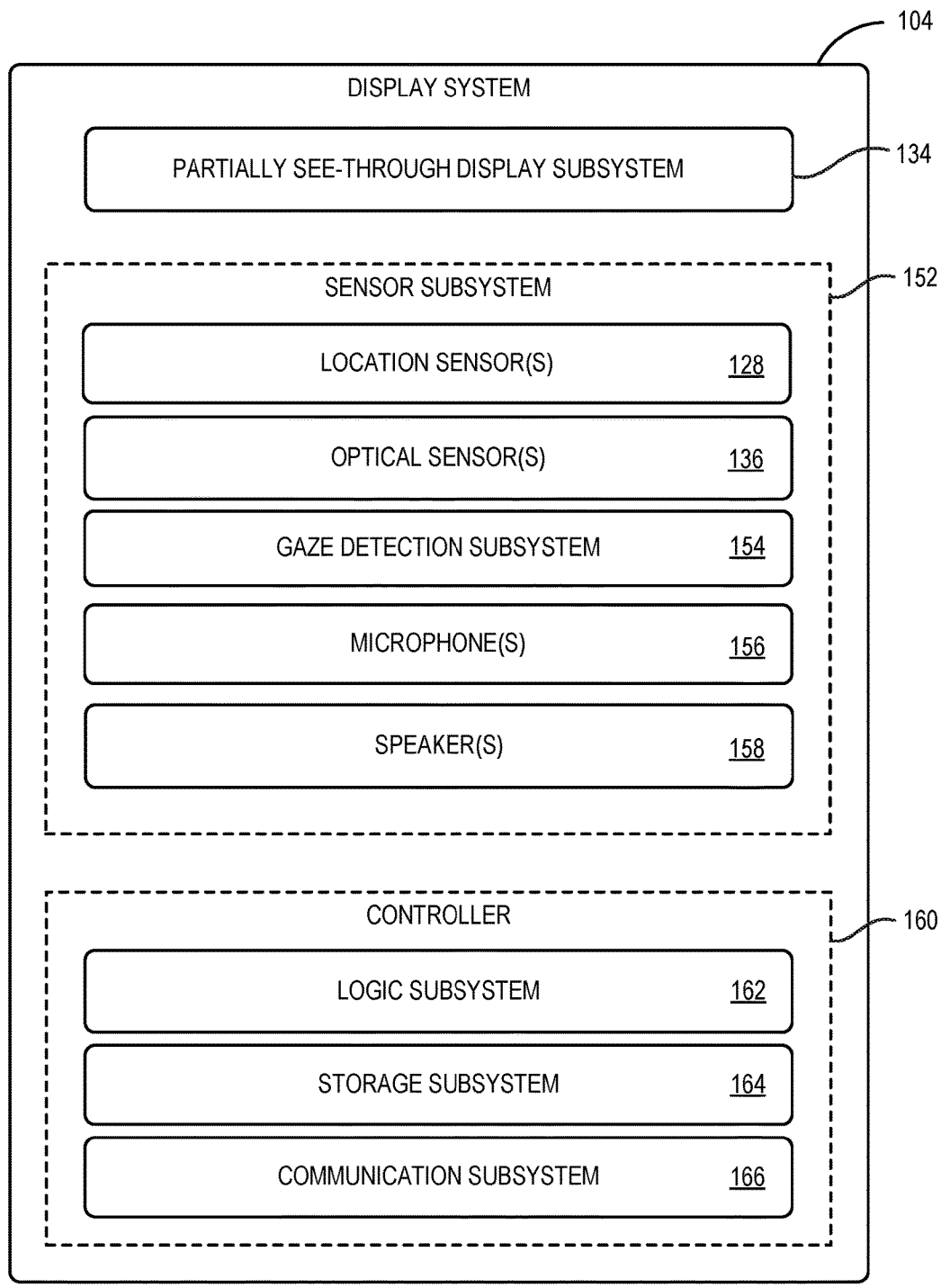
FIG. 8 shows a schematic diagram of an example HMD device of the computing system of FIG. 1.

FIG. 8 is a schematic view of an example HMD device 104, which could be used as any of the above described HMD devices 104, 114, and 122 (see FIG. 3). HMD device 104 includes one or more lenses that form a part of the at least partially see-though display subsystem 134, such that images may be displayed via the lenses (e.g. via projection onto lenses, waveguide system(s) incorporated into lenses, and/or in any other suitable manner). Display subsystem 134 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the display subsystem 134 may utilize quantum-dot display technologies, active-matrix organic LED (OLED) technology, and/or any other suitable display technologies.

Display system 104 further includes a sensor subsystem 152, which includes one or more optical sensor(s) 128, examples of which may include but are not limited to outward-facing image sensors configured to acquire images of a physical environment, and one or more location sensor(s) 128, examples of which may include but are not limited to an accelerometer, a gyroscopic sensor, a magnetometer, a global positioning system (GPS) sensor, and an inertial measurement unit (IMU). Such sensor(s) may help to determine the position, location, and/or orientation of the display device within the environment, which may be used to help determine the positions, locations, and/or orientations of other display devices being used by other people relative to display system 104, e.g. to determine the orientation of the display system 104 relative to other display devices. Optical sensors 128 may include one or more depth sensor(s) and/or one or more two-dimensional image sensor(s) (e.g. RGB image sensors). Display system 104 may display completely virtual scenes via display subsystem 134, may display video-based augmented reality images via a viewfinder mode using data from an outward-facing image sensor, or may display augmented reality images via a see-through display subsystem.

Sensor subsystem 152 may further include a gaze detection subsystem 154 configured to detect a gaze direction of a user as user input for computing device actions. Gaze detection subsystem 154 may be configured to determine gaze directions of each of a user's eyes in any suitable manner. For example, gaze detection subsystem 154 may comprise one or more glint sources, such as infrared light sources, configured to cause a glint of light to reflect from each eyeball of a user, and one or more image sensor(s), such as inward-facing sensors, configured to capture an image of each eyeball of the user. In other examples, gaze detection subsystem 154 may be omitted.

Display system 104 also may include additional sensors, as mentioned above. For example, display system 104 may include and one or more microphones 156 configured to detect sounds. Motion sensors, as well as microphone(s) 156 and gaze detection subsystem 154, also may be employed as user input devices, such that a user may interact with the display system 104 via gestures of the eye, neck and/or head, as well as via verbal commands. It will be understood that sensors illustrated in FIG. 8 are shown for the purpose of example and are not intended to be limiting in any manner, as any other suitable sensors and/or combination of sensors may be utilized.

Display system 104 further includes one or more speaker(s) 158, for example, to provide audio outputs to a user for user interactions. Display system 104 further includes a controller 160 having a logic subsystem 162 and a storage subsystem 164 in communication with the sensors, gaze detection subsystem 154, display subsystem 134, and/or other components. Storage subsystem 164 comprises instructions stored thereon that are executable by logic subsystem 162, for example, to perform various tasks related to determining a display position of an augmented reality image, as disclosed herein. Logic subsystem 162 includes one or more physical devices configured to execute instructions. Communication subsystem 166 may be configured to communicatively couple the display system 104 with one or more other computing devices. Logic subsystem 162, storage subsystem 164, and communication subsystem 166 are described in more detail below in regard to FIG. 9.

Display system 104 is described for the purpose of example, and thus is not meant to be limiting. It is to be understood that display system 104 may include additional and/or alternative sensors, cameras, microphones, input devices, output devices, etc. than those shown without departing from the scope of this disclosure. Near-eye display system 104 may be implemented as a virtual reality display system or an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on display system 104 or other suitable display system, or may be executable remotely on a computing system in communication with display system 104.

Figure 9:
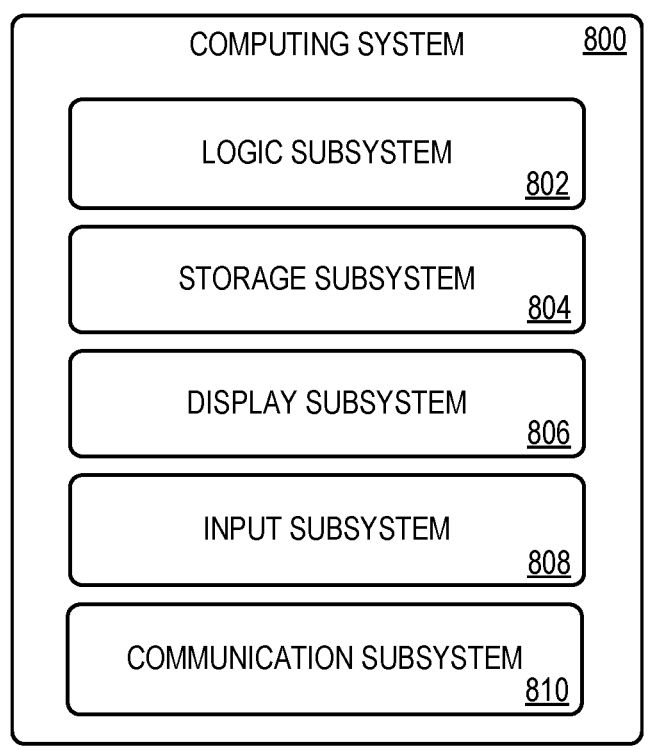
FIG. 9 shows a schematic diagram of an example computing device that could be used as a server or other computing device of the computing system.

FIG. 9 schematically shows a non-limiting example of a computing system 800 that can enact one or more of the methods and processes described above. The computing system 800 is shown in simplified form. The computing system 800 may take the form of one or more personal computers, server computers, tablet computers, home-entertainment computers, network computing devices, gaming devices, mobile computing devices, mobile communication devices (e.g., smart phone), and/or other computing devices, including but not limited to the wearable devices and/or server devices described above.

The computing system 800 includes a logic subsystem 802 and a storage subsystem 804. The computing system 800 may optionally include a display subsystem 806, input subsystem 808, communication subsystem 810, and/or other components not shown in FIG. 9.

Logic subsystem 802 includes one or more physical devices configured to execute instructions. For example, logic subsystem 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 802 may include one or more processors configured to execute software instructions. Additionally or alternatively, logic subsystem 802 may include one or more hardware or firmware logic subsystems configured to execute hardware or firmware instructions. Processors of logic subsystem 802 may be single-core or multi-core, and the instructions executed thereon may be configured for sequential, parallel, and/or distributed processing. Individual components of logic subsystem 802 optionally may be distributed among two or more separate devices, which may be remotely located and/or configured for coordinated processing. Aspects of logic subsystem 802 may be virtualized and executed by remotely accessible, networked computing devices configured in a cloud-computing configuration.

Storage subsystem 804 includes one or more physical devices configured to hold instructions executable by the logic subsystem 802 to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage subsystem 804. This visual representation may take the form of virtual objects and images presented for an immersive virtual or augmented reality experience. As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition, an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Communication subsystem 810 may include a communication unit and may be configured to communicatively couple computing system 800 with one or more other computing devices. Communication subsystem 810 may include wired and/or wireless communication devices compatible with one or more different communication protocols. As non-limiting examples, communication subsystem 810 may be configured for communication via a wireless telephone network, or a wired or wireless local- or wide-area network. In some embodiments, communication subsystem 810 may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display (HMD) device comprising:
an at least partially see-through display configured to display an augmented reality image representing a virtual object, the virtual object having at least a first portion, a second portion, and an associated script for animating the virtual object;
one or more location sensors from which the HMD device determines at least a location of the HMD device in a physical environment;
a communication unit configured to receive peer location data from at least one peer HMD device in the physical environment, wherein the peer location data indicates a peer field of view of the at least one peer HMD device, the peer field of view comprising a range within which augmented reality images may be presented; and
a processor configured to:
based at least on the received peer location data, identify a display position at which the virtual object is to be displayed and viewed in the physical environment by the HMD device and the at least one peer HMD device;
determine a shared focal point based on the display position, the location of the HMD device, and the peer location data;
determine a first orientation of the first portion of the virtual object at the display position based on the shared focal point and focal point information of the script, the first orientation being common to the HMD device and the at least one peer HMD device;
determine a second orientation of the second portion of the virtual object at the display position based on the focal point information and a device-specific focal point that corresponds to the location of the HMD device relative to the display position, the second orientation being specific to the location of the HMD device and differing from the at least one peer HMD device; and
display and animate the augmented reality image of the virtual object at the display position with the first portion at the first orientation and the second portion at the second orientation on the at least partially see-through display of the HMD device according to the script.

2. The HMD device of claim 1, wherein peer location data includes at least one of surface data about surfaces and candidate positions at which the augmented reality image can be displayed and viewed in the physical environment by the HMD device.

3. The HMD device of claim 1, wherein the communication unit is further configured to transmit an enumeration request to determine if one or more proximal HMD devices are in the physical environment; and
receive an enumeration response from the one or more proximal HMD devices indicating that the one or more proximal HMD devices are located in the physical environment.

4. The HMD device of claim 3, wherein the processor is further configured to identify the at least one peer HMD device from one or more proximal HMD devices based on one or more logical constraints.

5. The HMD device of claim 4, wherein the one or more logical constraints include at least one of: the one or more proximal HMD devices being within a predetermined distance of the determined location, the one or more proximal HMD devices being within a predetermined area, and the one or more proximal HMD devices belonging to a predetermined group.

6. The HMD device of claim 1, wherein the communication unit is configured to transmit location data about the HMD device to the at least one peer HMD device.

7. The HMD device of claim 1, wherein the processor is further configured to:
identify candidate positions at which the augmented reality image can be displayed and viewed in the physical environment by the HMD device.

8. The HMD device of claim 7, wherein the received peer location data comprises peer candidate positions at which the augmented reality image can be displayed and viewed in the physical environment by the at least one peer HMD device.

9. The HMD device of claim 8, wherein the processor is further configured to:
identify compatible positions at which the augmented reality image can be displayed and viewed in the physical environment by the HMD device and the at least one peer HMD device by comparing peer candidate positions to the candidate positions and determining overlapping positions visible by both the HMD device and the at least one peer HMD device; and
select the display position from the compatible positions based on one or more logical constraints.

10. The HMD device of claim 1, further comprising an optical sensor configured to acquire surface data about surfaces.

11. The HMD device of claim 10, wherein the received peer location data comprises peer surface data about surfaces within the peer field of view of the at least one peer HMD device.

12. The HMD device of claim 11, wherein the processor is further configured to:
identify compatible positions at which the augmented reality image can be displayed and viewed in the physical environment by the HMD device and the at least one peer HMD device by creating a union of the surface data and the received peer surface data and determining overlapping positions visible by both the HMD device and the at least one peer HMD device; and
select the display position from the compatible positions based on one or more logical constraints.

13. The HMD device of claim 1, wherein the augmented reality image is a virtual presenter, and the processor is further configured to:
determine a plurality of focal points based at least on one of: the display position, the location of the HMD device, and the peer location data; and
animate the virtual presenter to perform the script, wherein the script comprises gestures and focal point information about the plurality of focal points, and the gestures of the virtual presenter depend at least on the focal point information.

14. The HMD device of claim 1, wherein the augmented reality image is a virtual presenter, and the processor is further configured to:
display a presentation image at a presentation position, the presentation position being based on the location of the HMD device, the display position, and an area occupied by the virtual presenter; and
determine a plurality of focal points based at least on one of: the display position, the presentation position, the location of the HMD device, and the peer location data; and
animate the virtual presenter to perform the script, wherein the script comprises gestures and focal point information about the plurality of focal points, and the gestures of the virtual presenter depend at least on the focal point information.

15. The HMD device of claim 1, wherein the communication unit is further configured to determine that an additional HMD device has entered the physical environment, receive additional location data from the additional HMD device, and wherein the processor is further configured to transmit an instruction to the additional HMD device indicating an unoccupied position nearest to the additional HMD device at which the augmented reality image displayed at the display position can be viewed by the additional HMD device.

16. A method implemented at least in part by a head-mounted display (HMD) device, the method comprising:
determining a location of the HMD device in a physical environment;
receiving peer location data from at least one peer HMD device in the physical environment via a communication unit of the HMD device, wherein the peer location data indicates a peer field of view of the at least one peer HMD device, the peer field of view comprising a range within which augmented reality images may be presented;

with a processor of the HMD device:
based at least on the received peer location data, identifying a display position at which an augmented reality image representing a virtual object, the virtual object having at least a first portion, a second portion, and an associated script for animating the virtual object, is to be displayed and viewed in the physical environment by the HMD device and the at least one peer HMD device with the processor;
determining a shared focal point based on the display position, the location of the HMD device, and the peer location data;
determining a first orientation of the first portion of the virtual object at the display position based on the shared focal point and focal point information of the script, the first orientation being common to the HMD device and the at least one peer HMD device;
determining a second orientation of the second portion of the virtual object at the display position based on the focal point information and a device-specific focal point that corresponds to the location of the HMD device relative to the display position, the second orientation being specific to the location of the HMD device and differing from the at least one peer HMD device; and
displaying and animating the augmented reality image of the virtual object at the display position with the first portion at the first orientation and the second portion at the second orientation on an at least partially see-through display of the HMD device according to the script.

17. The method of claim 16, wherein the augmented reality image is a virtual presenter, the method further comprising:
determining, with the processor of the HMD device, a plurality of focal points based at least on one of: the display position, the location of the HMD device, and the peer location data; and
animating the virtual presenter to perform the script, wherein the script comprises gestures and focal point information about the plurality of focal points, and the gestures of the virtual presenter depend at least on the focal point information.

18. The method of claim 16, wherein the augmented reality image is a virtual presenter, the method further comprising:
based at least on the location of the HMD device, the display position, and an area occupied by the virtual presenter, identifying a presentation position at which a presentation image can be displayed and viewed in the physical environment by the HMD device with the virtual presenter;
determining, with the processor of the HMD device, a plurality of focal points based at least on one of: the display position, the presentation position, the location of the HMD device, and the peer location data;
displaying the presentation image at the presentation position on the at least partially see-through display of the HMD device; and
animating the virtual presenter to perform the script, wherein the script comprises gestures and focal point information about the plurality of focal points, and the gestures of the virtual presenter depend at least on the focal point information.

19. A server to control augmented reality image localization for multiple head-mounted display (HMD) devices, comprising:
memory to store a representation of a physical environment;
a processor configured to:
receive location data from the HMD devices in the physical environment, the location data comprising a range within which augmented reality images may be presented;
based at least on the received location data, identify a display position at which an augmented reality image representing a virtual object is to be displayed and viewed in the physical environment by all of the HMD devices, the virtual object having at least a first portion, a second portion, and an associated script for animating the virtual object;
determine a shared focal point of the HMD devices based on the display position and the location data;
determine a first orientation of the first portion of the virtual object at the display position based on the shared focal point and focal point information of the script, the first orientation being common to the HMD devices;
determine a second orientation of the second portion of the virtual object at the display position based on the focal point information and a device-specific focal point that corresponds to the location of a first HMD device relative to the display position, the second orientation being specific to the location of the first HMD device and differing from other HMD devices; and
propagate the display position back to the HMD devices to cause display and animation of the augmented reality image of the virtual object at the display position with the first portion at the first orientation and the second portion at the second orientation on an at least partially see-through display of the first HMD device according to the script.

20. The server of claim 19, wherein the augmented reality image is a virtual presenter; and
the processor is further configured to:
based at least on the location data, the display position, and an area occupied by the virtual presenter, identify a plurality of presentation positions at which a presentation image can be displayed and viewed in the physical environment by each of the HMD devices with the virtual presenter;
determine a plurality of focal points based at least on one of: the display position, the plurality of presentation positions and the location data;
create an animation of the virtual presenter to perform the script, wherein the script comprises gestures and focal point information about the plurality of focal points, and the gestures of the virtual presenter depend at least on the focal point information; and
propagate the plurality of presentation positions back to each of the HMD devices to cause display of the presentation image at one of the plurality of presentation positions on the at least partially see-through display of each of the HMD devices; and propagate the animation back to each of the HMD devices to cause animation of the virtual presenter on the at least partially see-through display of each of the HMD devices.

\* \* \* \* \*